Nov. 24, 1942.　　　E. KOHLER　　　2,302,947
HARNESS
Filed March 15, 1940　　　2 Sheets-Sheet 1
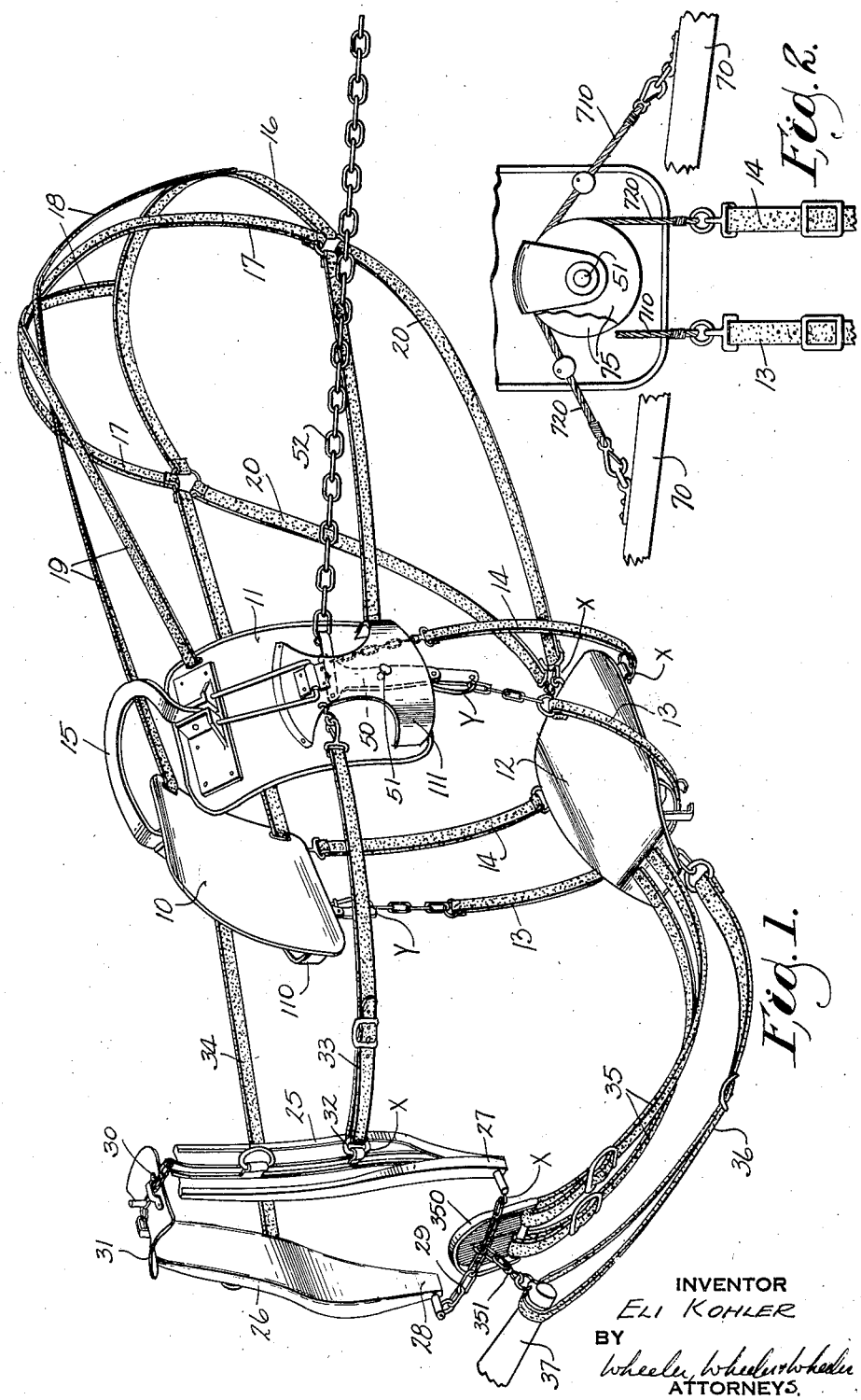
INVENTOR
ELI KOHLER
BY
Wheeler, Wheeler & Wheeler
ATTORNEYS.

Nov. 24, 1942.　　　　E. KOHLER　　　　2,302,947
HARNESS
Filed March 15, 1940　　　2 Sheets-Sheet 2
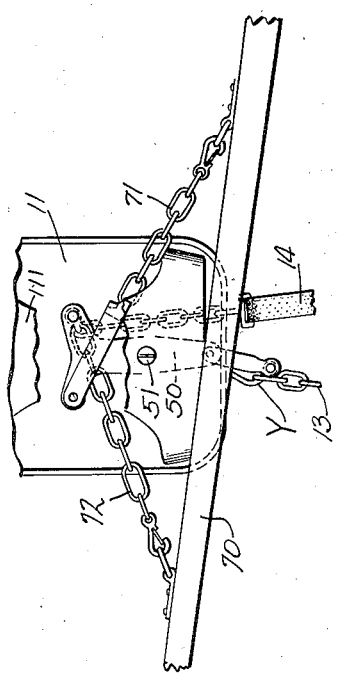
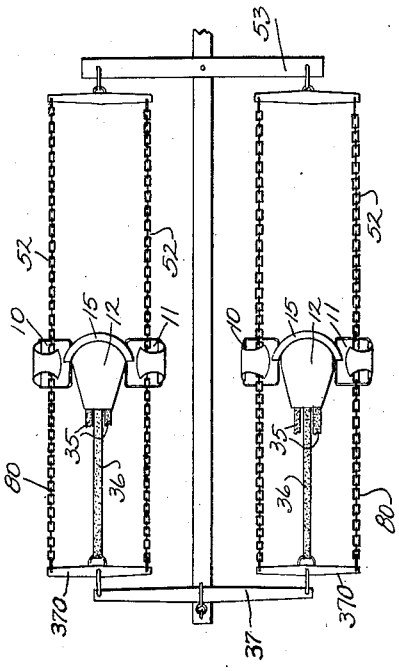
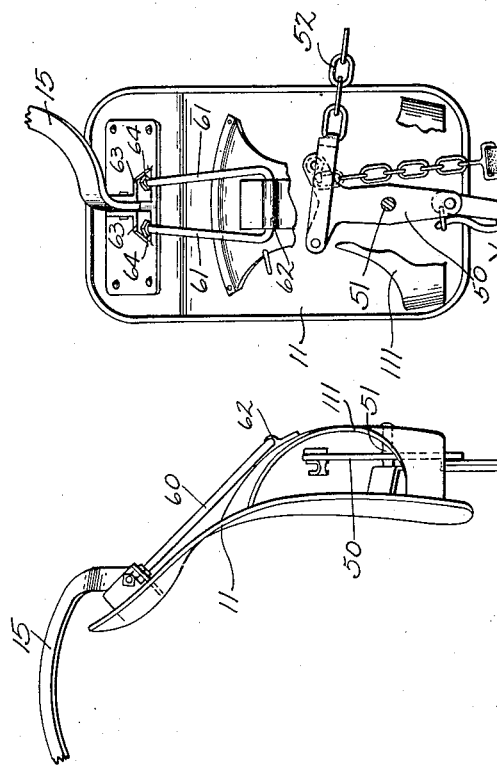
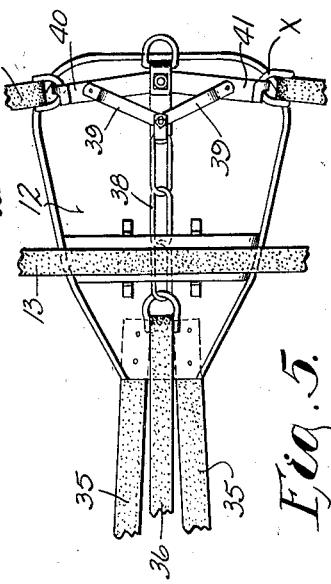
INVENTOR
ELI KOHLER
BY
Wheeler, Wheeler & Wheeler
ATTORNEYS Patented Nov. 24, 1942

2,302,947

UNITED STATES PATENT OFFICE 2,302,947

HARNESS

Eli Köhler, Milwaukee, Wis.

Application March 15, 1940, Serial No. 324,057

8 Claims. (Cl. 54—1)

My invention relates to improvements in harness.

The object of my invention is to provide a harness for draft animals to operate upon the principle of contraction about the barrel-like body of the animal, rather than upon the principle of application of the load to the shoulders of the animal.

Another object of my invention is to provide, in a contractile type harness, a girth construction responsive contractilly in proportion to the draft accomplished by the animal.

Another object of my invention is to provide back, neck, and chest pads for my harness which are so constructed as to provide leverage and linkage connections for the various parts of my harness, whereby to apply contractile forces to the various elements of my harness in proportion to the draft exerted by the animal.

My harness neck-piece is likewise contractile and does not rest against the shoulders of the animal. It is applied to the flat side of the heavy neck muscles. Practically no direct draft is applied thereto. Only the ancillary purpose of positioning the draft elements is the function of the neck-pieces.

Other objects with respect to more detailed portions of my harness will be apparent from the examination of the following specification.

In the drawings:

Fig. 1 is a perspective of my harness with the parts designed and disposed as they would be for application to a draft animal such as a horse.

Fig. 2 is a side elevation of a portion of the back part with special equipment of adaptation to the work for draft of vehicles having shafts.

Fig. 3 is a plan view of a back pad, a portion of the shield being broken away to show the lever and linkage connections for a trace and girth straps.

Fig. 4 is an elevation of a back and side "pad" of the type shown in Fig. 3 with a view at right angles to that shown in Fig. 3.

Fig. 5 is a view from below showing the underside of the chest pad and its connecting parts.

Fig. 6 is a view similar to Fig. 2, but showing lever construction in place of the pulley and cable construction shown in Fig. 2.

Fig. 7 is a somewhat diagrammatic plan view of certain portions of my harness in connection with a wagon pole, double tree and neck yoke, commonly used in team draft of wagons and the like. The harness in Fig. 7 is a modification of that shown in Fig. 1.

Like parts are identified by the same reference characters throughout the several views.

From my analysis of the anatomy of draft animals and the application thereto of proper harness for accomplishing maximum draft or backing forces of such animals with preservation of maximum freedom of leg movement of such animals, I have found that the conventional harness which applies virtually the entire load directly upon shoulder movement and lower bony structure less capable of sustaining such pressure and hindering cruelly the free muscle and leg motion of the animal. Furthermore, with such conventional harness, the conventional collar applies maximum pressure to one shoulder just as the animal lifts and advances its front leg on that side. Thus, when the animal needs freedom of motion to quickly advance his fore-leg for another firm grip of his hoofs upon the ground the entire load resists that movement. Also when the animal is backing and should be exerting its greatest force in a rearward direction under heavy load, the conventional breeching or breech strap confines and hinders the hind leg movement of the animal and actually trips and lifts the hoofs of the animal from the ground so as to leave the fore-legs of the animal the only resisting elements functioning one at a time.

I have therefore, provided the harness shown in the drawings and it will be seen from an examination thereof and from the description hereinafter set forth, that my harness is fundamentally a contractile assembly, operating primarily upon the muscles of the barrel-like body of the animal, but also operating contractilly upon the heavy muscles of the base of the neck, breast and sternum and it will be seen that not only is the contractile principle relied upon to apply the forces upon the parts of animal's body well supplied with deep layers of muscles and best suited to sustain such contractile forces, but also the contractile force is proportional to the exertion and amount of draft which the animal is applying to the work. I thus take advantage of a natural phenomenon which I have noted to exist in all draft animals, namely, that when under severe strain or when exerting itself, an animal expands its torso and maintains its body in expanded condition throughout the period of exertion. Therefore, my harness acts like a brace and supports the animal in its action with all propelling muscles and limbs of locomotion free.

Substantially the entire pulling and backing stresses exerted by an animal provided with my harness are centralized upon structure included in my back pads 10 and 11 and in a chest pad 12. These pads and spaced girth straps 13 and 14 and a relatively rigidly arched tree complete what I will hereafter term the primary contractile assembly which is positioned to extend about the forward part of the barrel-like body of the draft animal. While the dimensions are not critical, it will be of assistance in the understanding of the principles of operation of my harness if I state that in heavy draft harness back pads having a width dimension of 12" and height dimension of 20", and chest pad dimensions of 15" by 15" have been found satisfactory.

Breeching 16, breeching straps 17, breeching stays 18, back straps 19 and side straps 20 provide devices, the primary function of which is to prevent forward movement of the primary contractile assembly upon the body of the animal. The function is therefore entirely different from the breeching in ordinary harness, and the application of the "breeching" 16 is much higher on the rump of the animal so that the stays and side straps are more nearly in a straight line in their connection to the primary contractile assembly. No tripping of the hind legs of the animal can result from any backing strain which may be taken care of by this portion of my harness.

I have referred above to my primary contractile assembly. My secondary contractile assembly includes structure now to be described and including members applicable to the sides of the heavy neck muscles forwardly of the animal's shoulders.

My secondary contractile assembly which I use is not at all comparable to the collar as used heretofore in conventional harness. Two neck side-pieces 25 and 26 are shaped intermediate their ends to conform to the side of the base of the neck of the animal. These side-pieces are substantially rigid and their lower termini 27 and 28 extend out from the lower part of the neck of the animal to prevent pressure on the jugular vein. These termini are so shaped that when connected by a chain 29 or other suitable links, the sides are held flat against the side of the neck and are not permitted to rock into a position against the animal's shoulders. The upper ends of the side-pieces are connected by similar chain or linkage 30 shielded from the upper part of the animal's neck by any form of top pad 31.

At 32, at approximately the location where traces would normally be fastened to a collar in a conventional type harness, I attach upper side straps 33 and 34 which extend back at either side of the animal to a point of attachment with the primary contractile harness assembly. These side straps constitute the upper connections between my primary and secondary contractile assemblies.

A breast strap or pair of breast straps 35 extends from the forward edge of the chest pad 12 to a point of connection with a breast pad 350 to cooperate with the upper side straps 33 and 34 to assist in holding the primary contractile assembly in position upon the barrel of the body of the animal. These straps 35 constitute the lower connection between my contractile assemblies. A chain 351 connects the breast pad with the neck yoke, as shown.

I do not find in the dictionary or technical literature upon the subject strictly accurate nomenclature for strap 36 which extends forwardly from my contractile assembly to a point of connection with the neck yoke 37, but it most nearly approaches the function of a martingale, as that term is used in common parlance in mid-western portions of the United States, and I shall hereinafter refer to it as a martingale.

The martingale 36 is attached to a neck yoke 37 and is placed in tension when the animal is holding back or is "backing up." As shown clearly in Fig. 5, the martingale is secured at its rearward end to linkage 38—39 to pull forwardly in a toggling action upon girth links 40 and 41 which form the lower termini of girth straps 14. Thus, in any movement of the animal placing tension upon the martingale 36, girth straps 14 are placed in increased tension and tend to increasingly contract the primary contractile assembly upon the body of the animal. At the same time a downward pull is exerted centrally upon the collar links 29, and because of the rigidity of the collar side pieces 25 and 26, the upper ends of the side pieces tend to separate to the limit permitted by the links 30.

The upper ends of girth straps 13 and 14, as shown in Figs. 1 and 3, are attached at either end of a rock lever 50 pivotally mounted upon a pin 51 extending between the back pad 10 or 11 and the shield 110 or 111 forming part of the back pad assembly. The shield is shaped as indicated in the drawings so as to protect the operating mechanism when the animal rubs against substantial objects. It will be noted that the girth strap 13 is attached at one end of the rock lever 50 and the girth strap 14 is attached to the other end so that the rock lever may oscillate about the pin 51. If the girth strap 13 is tightened, girth strap 14 is loosened. If girth strap 14 is tightened by the martingale then a certain amount of tightening of strap 13 is accomplished through lever 50. At the same end of the rock lever to which girth strap 13 is secured, I secure the forward end of trace 52 which extends backwardly to the evener bar 53 and it will thus be seen that increased stress or draft upon the trace 52 will cause the rock shaft to oscillate upon the pin 51 and tighten girth strap 13.

In my harness, as shown in Fig. 1 the neckyoke 37 is supported by chain 351 connected between the neckyoke and a link midway of chain 29. Holdback or backing stresses may thus be sustained by martingale 36 with some assistance by the chain 351. This will draw together the neck side pieces 25 and 26. In the Fig. 7 construction, chain 351 is connected to the center of the sub-neck yoke 370 which in turn supports the neck yoke 37. Holdback or backing stresses are then divided between martingale 36 and side backers 80. Each of these sidebackers extends from one end of sub-neck yoke 370 to a point of attachment with the rock lever 50 in the back pad assembly just as hold-back chain 72 is attached thereto in my single harness. The action of the side backers 80 is comparable to the hold-back chain 72 in that they place additional contractile stress upon girth 14.

For ready removal of the harness from the animal, I provide hooks and links at obvious points marked X in the drawings. At Y, as shown most clearly in Figs. 1, 3, and 6, I provide a take-up latch for placing substantial tension in a contractile direction upon girth strap 13.

So that the back pads 10 and 11 may be curved to conform to the bodily contours of a particular animal, I provide adjustment take-up rods 60 and 61 secured to the shield at 62 and extending through brackets 63 at the point of attachment of the back pad with the tree 15. Tightening or loosening of the nuts 64 will change the curvature of the back pad to conform to the animal.

The harness thus far described is of a type suitable for team harness. For adaptation of my contractile type harness to single horse drawn equipment having shaft 70, I provide trace chain 71 secured to rock lever 50 in a manner identical to that shown in Fig. 3, but I provide hold-back chain 72 connected to the other end of rock lever 50 to perform the same function with respect to girth strap 14 that I obtain through the use of martingale 36. In the single harness, when the horse holds back upon the shaft 70 the girth strap 14 is tightened and when the load is pulled forwardly by the trace 71 the girth strap 13 is tightened. The secondary contractile assembly is used for the neck of the animal in single harness, the martingale being unnecessary and merely retained upon chain 351.

An alternative construction in place of the rock lever 50 is shown in Fig. 2 where it will be seen that I have provided a pair of puleys 75 side by side upon pin 51 and a cable 710, corresponding to the trace 71 in Fig. 6, extends over one of the pulleys and connects with girth strap 13 and hold-back cable 720 extends over the other pulley and is connected with girth strap 14.

From the above description and from an examination of the drawings, it will be seen that I have applied the draft of traces 52 directly to a primary contractile assembly which bears upon the forward part of the barrel-like body of the animal, rather than to apply the entire strain upon its shoulder and leg muscles. I thus free the fore-legs for independent and effective work. Furthermore, the stress of holding back or backing up a load is applied to this same contractile assembly without hindering the free movement of the hind legs of the animal.

The natural inquiry of anyone experienced in matters of this kind is whether the contractile forces exerted by the contractile assembly upon the body of the animal are of any degree of severity approaching the limit of what the animal can sustain. I have proved upon repeated tests of my harness that even under the maximum load of which the animal is capable, there is never so much contractile force exerted as to even approach a severely compressive force upon the hand of a person placed under one of the back pads or between the chest pad and the animal's body. Furthermore, I have found that animals provided heretofore with the conventional harness cannot equal in pulling power the same animals equipped with my new type of harness; and I ascribe the success of my harness primarily to the freeing of the limbs of the animal for the performance of their natural function. At no time have I found that with animals equipped with my harness there is any marked tendance of the harness to slide forwardly or rearwardly upon their bodies.

The freedom of movement made possible by my harness results in bettered physical condition of draft animals as evidenced in almost every instance where my harness has supplanted the conventional harness. In fact, universally, horses equipped with my harness have "fatted up" even on reduced rations. Chafing and galling have proved to be nonexistent after long-continued use of my harness.

I claim:

1. A harness for draft animals comprising a girth including spaced back pads adapted to conform to the back of the animal at either side of its backbone, a chest pad, and strap elements between said pads, said pads providing substantial area to distribute compressive strains upon the girth, contractile means for said strap elements in the girth, and draft load connections to said contractile means.

2. A harness for draft animals including a girth-like principal draft assembly shaped to extend about the body of the animal behind its forelegs, said assembly comprising spaced back pads, a chest pad for distributing pressure, strap elements therebetween including linkage for contracting the assembly, the strap element between the back pads being a substantially rigid member in articulate relation to said pads, and draft load connections to said means for contracting the assembly whereby to place the assembly in tension in proportion to the draft load.

3. A harness for draft animals, including a girth-like principal draft assembly shaped to extend about the body of the animal behind its fore legs, said assembly comprising spaced back pads and a chest pad for distributing pressure over a considerable area, strap elements therebetween including linkage for contracting the assembly, and traces connected to said linkage whereby to contract said assembly about the body of the animal in proportion to draft on said traces.

4. In a draft animal harness provided with a contractile girth and constructed to operate on the principle of girth contraction as described, a martingale connected to said harness by leverage whereby upon rearward movement of the animal the girth is contracted.

5. In a draft animal harness having a contractile girth and constructed to operate on the principle of girth contraction as described, a primary contractile assembly for the body of the animal whereby upon rearward movement of the animal the girth is contracted, a secondary contractile assembly for the neck of the animal including rigid side members and connecting links therebetween, a draft connection secured centrally to one of said links whereby to draw said side members together when backing strain is applied thereto, and connection between the primary and secondary contractile assemblies.

6. Back pads for a girth-like contractile type harness, said pads comprising relatively inflexible members shaped to the back and side contours of a draft animal, and a shield for a portion of and connected to each of said back pads, said pads being provided with a lever between each shield and its pad and connected to said contractile harness and provided with connection to a trace whereby upon application of a load to the trace the lever may be moved to contract the harness.

7. In a harness for a draft animal having a barrel-like body, a contractile draft harness assembly having at least two girth elements spaced forwardly and rearwardly of each other, and draft connections to said girth elements, said connections including means whereby in forward movement of the animal with reference to its load to tighten the forward girth element and in rearward movement of the animal to tighten the rearward girth element.

8. A draft animal harness and harness connections including a contractile girth assembly for the body of the animal, said assembly including spaced girth elements, a rock lever attached to said elements, traces extending rearwardly from the rock lever for forward draft connection to a load, and side backers extending forwardly from said rock lever, the shape of the rock lever being such as to place tension upon one or another of the girth members when moved by the traces or the side backers.

ELI KÖHLER.